May 25, 1943. G. A. JUNDT 2,320,084
CAN HOLDER AND DISPENSER
Filed April 27, 1940 2 Sheets-Sheet 1
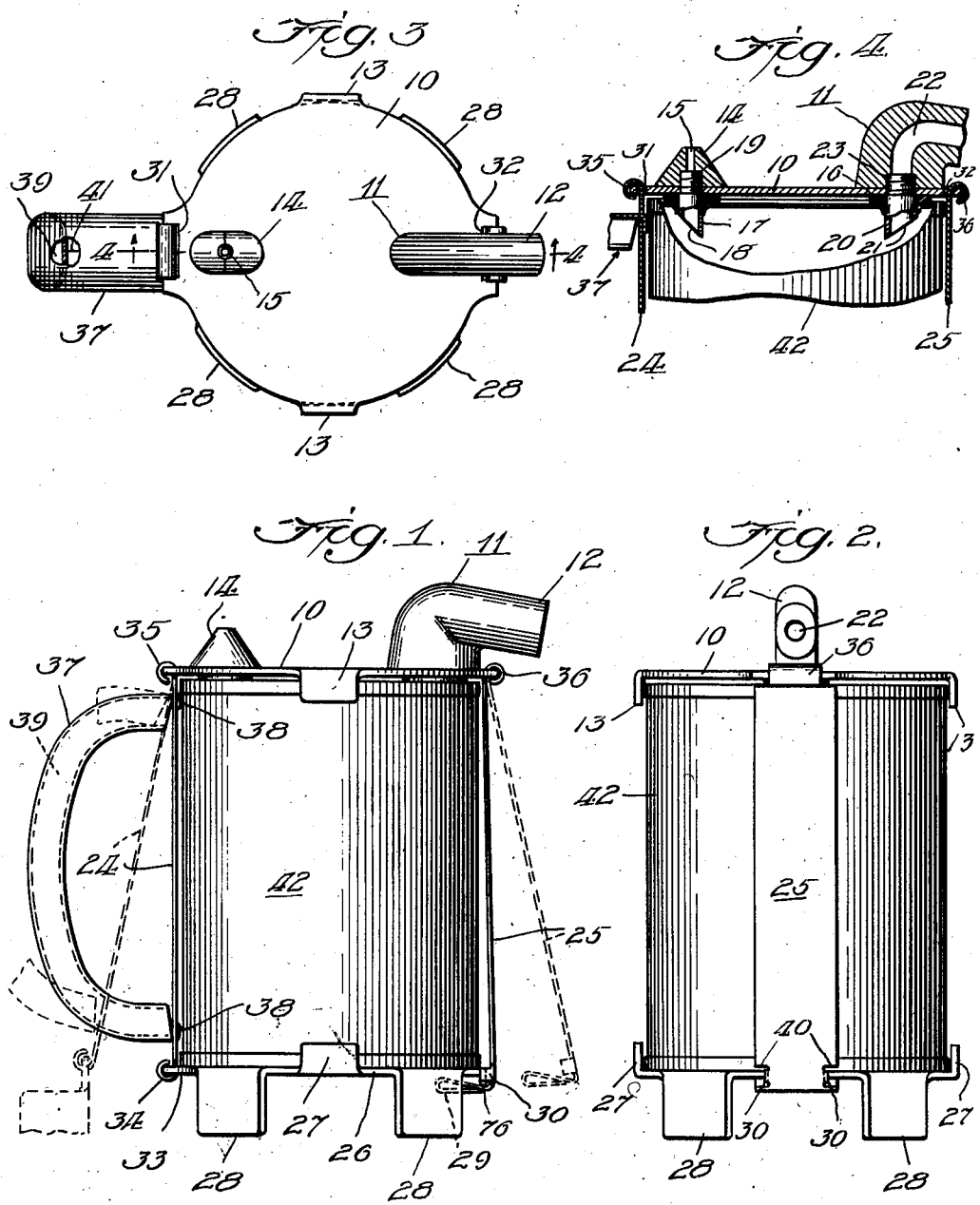
Inventor:
George A. Jundt May 25, 1943.  G. A. JUNDT  2,320,084
CAN HOLDER AND DISPENSER
Filed April 27, 1940  2 Sheets-Sheet 2
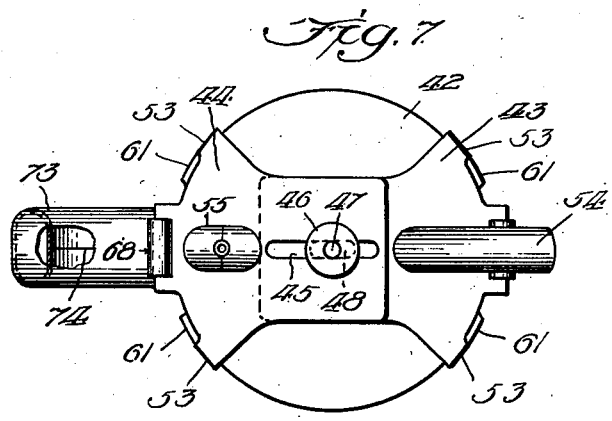
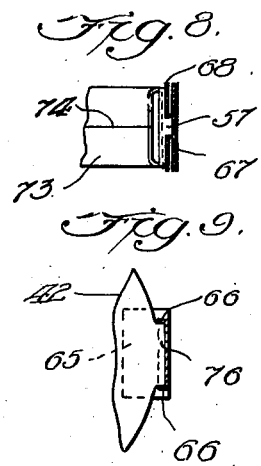
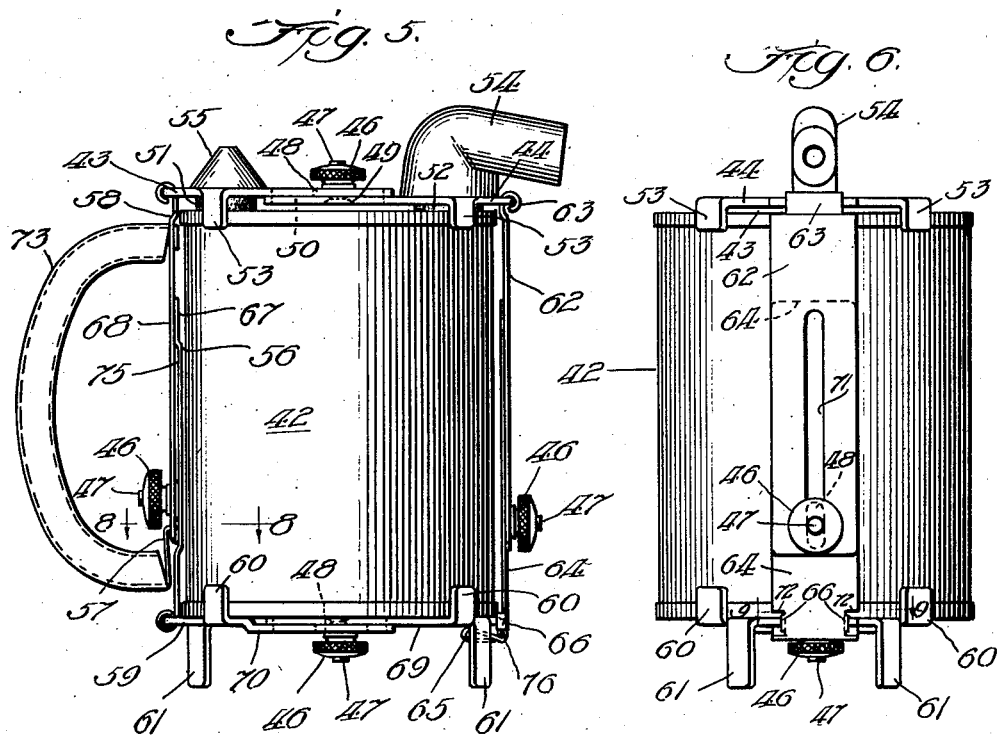
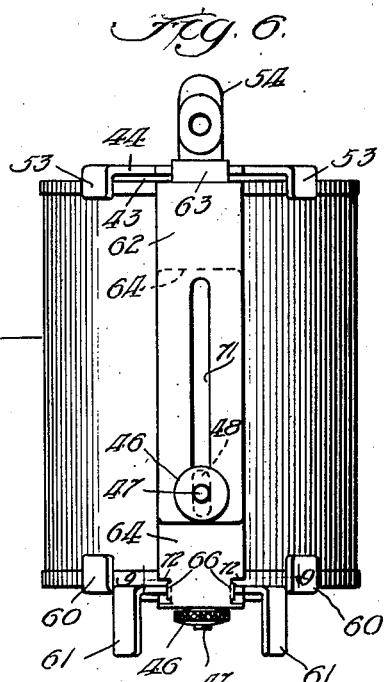
Inventor:
George A. Jundt Patented May 25, 1943

2,320,084

UNITED STATES PATENT OFFICE 2,320,084

CAN HOLDER AND DISPENSER

George A. Jundt, Chicago, Ill.

Application April 27, 1940, Serial No. 331,969

4 Claims. (Cl. 65—61)

This invention relates to can holders and dispensers and is especially adaptable for cans containing liquids.

One object of my invention is to provide an article of the above mentioned character which can be easily and readily attached to a can filled with liquid contents.

Another object of my invention is to provide a can holder and dispenser which may be adjusted for different diameters or base dimensions of cans and which may be adjusted to accommodate also different heights of cans, or containers having varied base areas.

Another object of my invention is to provide a device of the character and nature heretofore mentioned which is practical, useful, efficient in operation, rigid and durable in construction, and provided with a simple arrangement of parts which will lend itself admirably to economical quantity production.

Other objects and features of my invention will become readily apparent by reference to the accompanying drawings and the ensuing description wherein like numerals are used to designate like parts and in which:

Fig. 1 shows a front elevational view of one form of my invention.

Fig. 2 shows a side elevational view of my invention.

Fig. 3 is a top elevational view showing partly in cross-section the structure of the handle, a component part of my invention.

Fig. 4 is a fragmentary longitudinal cross-sectional view showing the arrangement of the spout and vent hole structure utilized in my invention.

Fig. 5 is a front elevational view of an improved form of my invention.

Fig. 6 is a side elevational view of the view shown in Fig. 5.

Fig. 7 is a top elevational view of the view shown in Figure 5, with a fragmentary cross-sectional portion showing the nature of the construction of the handle used in connection with my invention.

Fig. 8 is a transversal cross-sectional view on the line 8—8 of Figure 5.

Fig. 9 is a transversal cross-sectional view on the line 9—9 of Figure 6.

Referring to the drawings particularly Figs. 1, 2, 3, and 4, one form of my invention is comprised of a top plate member 10 connected to side strap members 24 and 25 in a manner indicated so as to permit articulation of the members 24 and 25 with respect to the plate member 10.

The plate member 10 is provided with slotted portions 31 and 32 in order to receive the articulate portions 35 and 36 of the members 24 and 25 respectively. The member 24 is provided with another hinge portion 34 at its other end which is articulately secured to a slotted portion 33 of the base plate member generally designated 26.

The top plate member 10 is provided with two or more can locating ears 13 bent downwardly as indicated in the view Figure 1; whereas the base plate member 26 is provided with two or more locating ears 27 bent upwardly.

The leg portions 28 are formed integrally with the plate member 26 by bending the same in a downward direction as indicated in Figures 1, 2, and 3.

To the top member is secured the knee shaped spout 11 having a spout portion 12 which has a bent orifice 22 permitting communication with the piercing tube 20 and the contents of the can 42 which has been pierced so that the liquid contents of the can 42 may be dispensed thru the orifice 22.

The locking strap member 25 is articulately secured to the plate member 10 by virtue of the slotted portion 32 in the plate 10 and the hinge portion 36 of the strap member 25.

The lower extremity of the strap member 25 is provided with a bent portion 29 and the lower portion of the strap above the portion 29 is recessed as indicated at 40 Figure 2 in order to provide material for forming the laterally located lugs 30 to permit the strap member to be located and positioned definitely in place when locking the invention in assembly with a can.

The base plate member 26 is provided with an extension lug 76 which is straddled by the lugs 30 and thus positions the strap member 25 fixedly in place when the hasp portion 29 is snapped into locking engagement.

The strap member 25 is preferably made of a springy material so that the locking hasp portion 29 will have sufficient resilience in order to effect a snap locking action when the device is attached to a can.

Referring to the longitudinal cross-sectional view of Figure 4, the vent hole and spout structure are more clearly indicated in detail. The top plate member 10 has secured thereto the two steel tubings designated 17 and 20 which are cut in angular relationship as indicated at 18 and 21 in order to provide suitable piercing elements.

The tubing 17 and 20 is made preferably of an oil hardening steel so that it may be properly ground in order to pierce readily the top portion of a can.

The tubing members 17 and 20 are provided with reduced threaded portions 19 and 23, respectively, to the portion 23 being attached the spout 11 having a suitable threaded hole for that purpose, while the conically shaped oval sectional portion 14 which is provided with a small vent hole 15 is secured to the threaded portion 19. Thus the air can replace the contents being dispensed thru the orifice 22 hence facilitating removing the contents from the can.

The can after being pierced by cutting sleeves 17 and 20 will require some element to seal the opening of the can with respect to the outer surface of the tube 17 and 20. For this purpose I provide resilient washer members 16 which may be made of rubber or any other similar material so as to furnish sealed joints and thus not permit any of the liquid contents to leak out thru the openings which have been made by the piercing operation of the tubings 17 and 20 respectively.

In attaching the device to a can 42, the top plate member 10 is first located so that the lugs 13 straddle the top portion of the can and the strap members 24 and 25 are allowed to hang down freely as indicated in the dotted line in Figure 1, the lower plate being in the position indicated. The can 42 is placed on a table or other supporting surface. The plate member 10 after the lugs 13 have been located approximately straddling the side edges of the top of the can, is subjected to pressure exerted upon it by the hand of a person, so as to cause the piercing tubes 17 and 20 to pierce the top surface of the can. The member 10 is first located firmly on the top of the can with the rubber gaskets 16 sealing the openings thus made, then the strap member 24 is brought down alongside of the can and by articulate action provided by the hinge 34 the bottom portion is brought under the can whence the lugs 27 will naturally locate themselves in opposed relationship with the lugs 13 of the member 10.

At this point the strap member 25 is forced into locking engagement by virtue of the hasp 29 being engaged over the lug 76 with the lugs 30 laterally engaging the lugs 76 and thus bringing the entire affair into positive locking engagement.

The arrangement provides a simple convenient and easy method of attaching such a holder to a can and permits revealing practically the entire surface of a can so that the device does not cover the advertising contained on the can and also serves as a convenient arrangement for holding the can by virtue of the handle 37 which is provided with the lugs 38 and which are secured to slots made or provided in the strap member 24.

The handle member 37 may be formed as indicated in the view Figure 3 of one sheet of metal folded over in the oval cross-section formation indicated in the view and closed over on the inside as indicated by the seaming line of contact 41. This makes a convenient handle arrangement for holding the can, which is light in weight because of the hollow portion 39.

By tilting the entire assemblage in a manner so that the spout 12 will be bent forward and downward, the liquid contents of the can may be poured thru the orifice 22 and the vent orifice 15 permitting the air to enter the can and replace the liquid contents being removed.

Another form of my invention is illustrated in Figures 5, 6, and 7, in which is shown an arrangement whereby my invention may be produced so as to accommodate cans of various heights and having various base dimensions or areas. To accomplish this purpose, the general formation or structural arrangement is practically the same as illustrated in Figures 1, 2, 3, and 4, except that in this instance each of the four members comprising my invention namely the top, bottom, and two side strap members are made of two elements rather than a single element indicated in the form of Figures 1, 2, and 3, being also articulately joined and using the same type of locking arrangement.

In this form the top structure of my invention is comprised of two plate members 43 and 44, being approximately shaped as indicated in Figure 7. Each plate is provided with locating lugs 53 as shown, the plate member 44 being provided with a slotted portion for receiving the strap member 68 and holding the same in articulate relationship whereas the plate 43 is provided with a similar slotted arrangement in order to receive the hinge 63 of the strap member 62 and hold the same in articulate relationship.

The lower or base support members are similar in shape to the members 43 and 44 and with this exception that in addition to the can locating lugs 60 they are also provided with the feet portions 61 which are bent in opposed relationship to the locating lugs 60 as indicated, also the member 59 is differentiated from the member 69 in that it has an offset portion 70 to accommodate slidably the plate member 69 so as to present a level supporting surface for the can 42. The members 59 and 69 are provided with feet 61 bent in juxtaposed relationship to the legs 60.

The general structure of the adjustable feature of this construction is indicated by a slotted arrangement in the side members generally indicated 71, also slotted portions indicated 45 and 50 in both members 43 and 44; similar slotted portions being indicated in the bottom members 69 and 59.

The arrangement for adjustability, generally, comprises a screw 47 having an ovally shaped enlarged shoulder portion fitting within the slotted portion of one of the members and a conically shaped flat-head portion 49 which fits in the slotted portion of the other component member in each instance, the strap structures being made of two component members as well as the top and bottom structures each being also made of two component members.

By virtue of this arrangement it is necessary to provide a thicker washer 51 on one side and a thinner resilient washer 52 on the opposite side, the reason for that is readily obvious, since the members 43 and 44 are superimposed upon one another.

The vent hole structure 55 and the knee spout 54 are constructed exactly the same as shown and indicated in the cross-sectional view of Figure 4.

The handle 73 is made of one piece of sheet metal preferably of oval cross-section which makes it very handy for the hand to grip and seamed as indicated at 74 preferably on the inside. It is provided with two lugs, one at the top (the strap member 68 being slightly bent as at 58 so as to provide clearance for the can 42) and a longer one at the bottom indicated by the numeral 57 which is adapted to be attached to the strap member 68, the strap member 67 being offset as indicated at 56 and providing the space 75 so that the lug 57 by virtue of which the handle is attached to the strap 68 may not impede the sliding operation when adjustments are being made.

In making adjustments to permit this form of my device to accommodate a certain sized can, what may be done, preferably, is to loosen any pair of oppositely located nuts 46, for instance, the top and bottom nuts 46. A quarter turn of the nuts will be sufficient to permit the members 43, 44, 59, and 69 to be adjusted to accommodate a certain can diameter, or can of a certain base area until the lugs 53 and 60 contact the edges of the can and hold it tangentially in fixed engagement.

It should be noted that the lugs 53 and 60 are made, preferably, straight so as to contact tangentially cans of different diameters, yet my invention would hold equally well cans of square, rectangular, or polygonal base areas.

After the device has been adapted to fit the shape of the base of a can to which the device is to be attached, then the nuts 46 are tightened, the nuts being knurled so that they can be conveniently manipulated by the fingers and no special tools being required.

The elongated portion 48 prevents the screw from turning and also holds the members 43, 44, 59, and 69 in fixed sliding relationship. Nut structures 46 in like manner hold the strap members 62, 64, 68, and 67 in a one way sliding relationship.

When the base of the can has been fitted to the device, the nuts 46 on the left and the right hand sides of the device are loosened about a quarter of a turn so as to permit adjustment for height, and when the height of the can has been accommodated, the screws 46 are tightened, thus maintaining the device in adjusted relationship. This adjustable form is attached to the can in like manner as the one described and shown in Figures 1, 2, and 3, namely, the top structure composed of the plates 43 and 44 is caused to pierce the top of the can first, then the handle and the base are folded around the can and the last element 64 containing the hasp portion 65 and the locating lug 76 provided in the base is straddled by the locating lug portions 66 of the strap member 64 made from the metal provided from the recesses 72 indicated in the view Figure 6.

When all of the contents of the can has been dispensed, and the can is empty, the device may be removed by unlocking the hasp portion 65 and allowing the base structure and the handle structure to unfold from contact with the can, whence the top structure comprised of the members 43, and 44 may be easily withdrawn from the perforations in the can. The can may then be discarded and replaced with another can of fresh contents and the same operation is resorted to in once again attaching my device to a can in the manner heretofore described.

Thus it can be seen that I provide a useful means of manipulation for a can, always retaining in full view the advertising and other beneficial information contained on a can, such as recipes and other formulas, it permits the advertiser's name to remain conspicuously before the user at any and all times, it is a structure which may be very readily attached to a can without any difficulty, and is simple and cheap to produce in quantity. The device is just as readily removed from a can after its attachment to said can once the contents of the can have been fully dispensed.

The vent hole structure which has a minute orifice and the knee shaped spout portion protect the contents of the device in conjunction with the seal provided by the resilient gasket material, thus preventing contamination and evaporation of the contents within the can.

Although I have described in detail the nature, utility, and structure comprising my invention so that those familiar with the art will readily understand it, I feel that it is susceptible of many alterations, modifications and improvements, hence I reserve the right to all such alterations, modifications, and improvements which come within the scope of my invention, and the purview of the foregoing description; my invention to be limited only by the subjoined claims.

Having thus described and revealed my invention what I claim as new and desired to secure by Letters Patent is:

1. In a device of the character described, a top can perforating structure, a bottom can supporting structure, strap means articulately secured to said top and bottom structures, and a second strap means articulately secured at one of its ends to the said top structure and provided with snap locking means at its other extremity for engagement with the said bottom structure, the said top and bottom structures provided with slidably adjustable and locating means adapted to fit containers of varied base areas and configurations.

2. In a device of the character described, a top can perforating structure, a bottom can supporting structure, strap means articulately secured to said top and bottom structures, and a second strap means articulately secured at one of its ends to the said top structure and provided with snap locking means at its other extremity for engagement with the said bottom structure, the said strap means and the said second strap means provided with slidably adjustable means adapted to conform to containers of varied heights.

3. In a device of the character described, a top can perforating structure, a bottom can supporting structure, strap means articulately secured to said top and bottom structures, and a second strap means articulately secured at one of its ends to the said top structure and provided with snap locking means at its other extremity for engagement with the said bottom structure, the said strap means and the said second strap means provided with slidably adjustable means adapted to conform to containers of varied heights, the said top and bottom structures provided with slidably adjustable and locating means adapted to fit containers of varied base areas and configurations.

4. A device of the character described comprising, a top member provided with perforating spout means and perforating venting means, a bottom member provided with foot portions, a strap member articulately secured at one of its ends to the said top member and at its other end to the said bottom member, a handle member secured to said strap member, a second strap member articulately secured at one of its ends to the said top member and provided with snap locking means at its other extremity, the said strap member and the said second strap member provided with slidably adjustable means adapted to conform to containers of varied heights, the said top and bottom member provided with slidably adjustable locating means adapted to fit containers of varied base areas and configurations.

GEORGE A. JUNDT.